United States Patent [19]
Batten

[11] Patent Number: 5,492,619
[45] Date of Patent: Feb. 20, 1996

[54] AUTOMATIC GREASE COLLECTION SYSTEM

[75] Inventor: William C. Batten, Asheboro, N.C.

[73] Assignee: Clearline Systems, Inc., Asheboro, N.C.

[21] Appl. No.: 226,696

[22] Filed: Apr. 12, 1994

[51] Int. Cl.[6] .................................................. B01D 35/05
[52] U.S. Cl. ........................... 210/86; 210/122; 210/170; 210/187; 210/242.1; 210/257.1; 210/258; 210/521; 210/540; 210/776
[58] Field of Search ...................... 210/187, 540, 210/258, 242.1, 257.1, 521, 170, 121, 776, 122, 86

[56] References Cited

U.S. PATENT DOCUMENTS

| | | | |
|---|---|---|---|
| 2,747,736 | 5/1956 | Mobley | 210/56 |
| 2,935,197 | 5/1960 | Marple | 210/109 |
| 3,144,408 | 8/1964 | Pascual | 210/322 |
| 3,975,276 | 8/1976 | Schmid | 210/207 |
| 4,132,238 | 1/1979 | Clark | 137/172 |
| 4,132,645 | 1/1979 | Bottomley et al. | 210/187 |
| 4,137,173 | 1/1979 | Jarvis et al. | 210/187 |
| 4,472,277 | 9/1984 | Bailey et al. | 210/238 |
| 4,802,829 | 2/1989 | Miller | 417/12 |
| 5,178,754 | 1/1993 | Batten et al. | 210/187 |
| 5,234,580 | 8/1993 | Murphy | 210/242.1 |
| 5,326,458 | 7/1994 | Johnson | 210/122 |

*Primary Examiner*—Robert A. Dawson
*Assistant Examiner*—Kenneth M. Jones
*Attorney, Agent, or Firm*—Rhodes Coats & Bennett

[57] ABSTRACT

Grease is separated from a mixture of grease and water in a grease collection tank having first and second access ports by skimming the grease from the mixture with a skimmer, and pumping the grease with a pump located in the first access port from the skimmer through a conduit to a storage container located in the second access port.

9 Claims, 2 Drawing Sheets

5,492,619

AUTOMATIC GREASE COLLECTION SYSTEM

BACKGROUND OF THE INVENTION

This invention relates to an apparatus for installation in conventional grease traps to allow separation and storage of grease or oil remote from water present in the trap.

Grease traps, which are commonly rectangular tanks made of precast concrete that are buried below grade, are widely used to collect mixtures of grease or oil and water which are discharged from from restaurants and other food preparation facilities, machine shops, industrial plants, parking garages, airport fueling areas, and numerous other areas where such mixtures are generated.

In the grease trap, the grease, being of a lower density than the water, rises to the top, forming a septate grease mat layer. Periodically, the entire contents of the trap; or the grease along with part of the water is removed from the trap, normally with a vacuum pump. The grease may then be disposed of in a landfill or sold to processors, or rendering companies, for conversion into useful products.

Processing of the grease into useful products is obviously preferred to dumping of the grease into a landfill, which also may not be possible due to increased environmental regulations. Processors, however, are not always willing to accept grease if it includes a significant percentage of water, i.e., more than 15%, because of the increased difficulty in processing. Moreover, the prolonged contact of water with the grease tends to make the grease rancid as a result of the break down of lipids into shorter chain fatty acids, thus decreeing the value of the grease.

The prior art discloses various methods and apparatus for separating for separating two immiscible liquids, and also discloses various methods and apparatus for removing one liquid from contact with the other after separation of the liquids into to layers in a separator. For example, in some cases, the lighter liquid is discharged by gravity from the separator through an upper pipe and the heavier liquid is discharged from the separator through a lower pipe. Generally, the methods and apparatus relate to the separation of grease or oil from water.

U.S. Pat. No. 2,747,736 to Mobley describes a device for removing grease from waste water in a separator, in which grease which floats to the top of the separator is removed by hydrostatic forces. The grease is then stored at a collecting and storage point remote from the separator.

U.S. Pat. No. 5,236,585 to Fink describes an apparatus comprised of a separator in which oil and water are separated. The oil, which floats to the top of the water, flows under gravity to a second separator, where remaining oil is removed, e.g., by filtration. Water is removed from the bottom of the first separator.

Other patents show similar devices. U.S. Pat. No. 4,915,823 to Hall, describes a device for separating oil from water in bilge discharges. After separation, the oil and water are removed through separate discharge pipes. U.S. Pat. No. 4,119,541 to Makaya, discloses a similar arrangement for cleaning up oil spills by separating oil from sea water. U.S. Pat. No. 4,400,274 to Protos, describes a gravity separator in which solids are removed prior to separation of the grease and water.

The kinds of apparatus disclosed in the prior art, however, are not readily adaptable for use with the thousands of conventional grease traps that currently exist. Since these traps are generally comprised of a concrete storage tank buried several feet below ground level, i.e., grade, which has a pair of generally cylindrical access ports fitted with manhole covers, removal or structural modification is difficult.

An apparatus which would permit removal of grease from water in conventional grease traps would be of great commercial utility.

SUMMARY OF THE INVENTION

The grease trap with which the present apparatus is used is comprised of a collection tank located below ground level which has first and second access ports extending upwardly to ground level where the upper end of the access ports are covered with manhole covers. The tank has an inlet pipe with a discharge end in the upper part of the tank for filling the tank with a mixture of grease and water, and a discharge pipe having an inlet end in the tank at a level below that of the discharge end of the inlet pipe for removal of water from the tank.

The apparatus of the present invention includes a grease skimmer having an inlet end positioned in the tank at a level, a grease sensor having a detector end located in the tank at a level above the discharge end of the inlet pipe, a pump associated with the skimmer positioned within the first access port, a storage container positioned in the second access port, and a conduit connecting the skimmer to the storage container.

The preferred pump includes a compressed air cylinder, an air line connecting the air cylinder to the skimmer, and a control valve positioned within the air line. When the sensor detects the presence of grease in the tank, it sends a signal to the control valve which opens to allow air to flow through the air line and propel grease from the skimmer into the storage container.

In one embodiment the apparatus includes a concentrator to concentrate grease for removal by the skimmer. Preferably, the concentrator is a slanted baffle plate over the skimmer.

DETAILED DESCRIPTION OF THE PREFERRED EMBODIMENT

Figure 1:
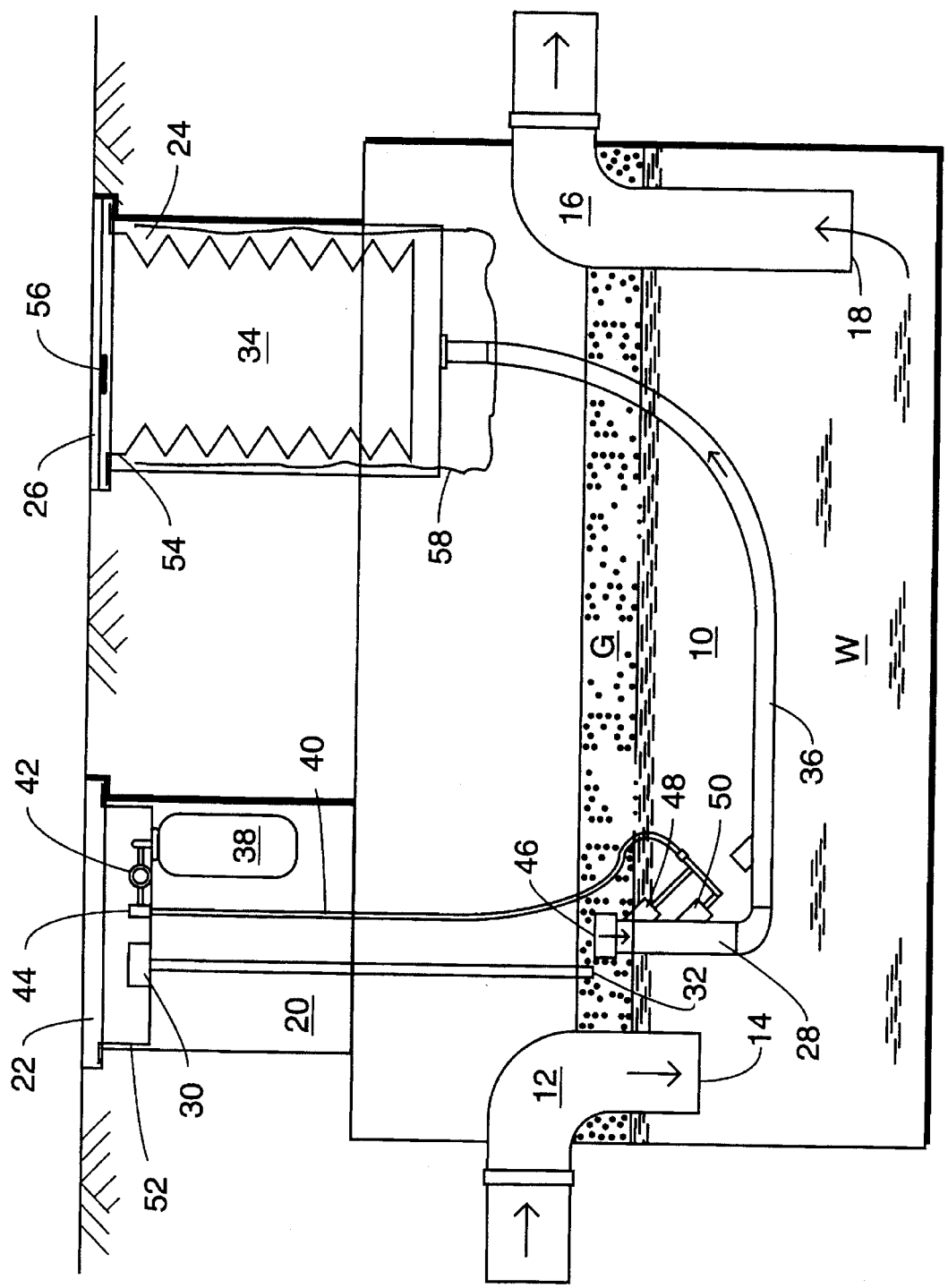
FIG. 1 is a sectional, schematic view of the apparatus of the present invention in association with a grease trap.

FIG. 1 illustrates the preferred embodiment of the present invention in association with a conventional grease trap comprised of a collection tank 10, provided with an inlet pipe 12 having a discharge end 14, and a discharge pipe 16 having an inlet end 18. A first access port 20, covered by manhole cover 22, and a second access port 24, covered by manhole cover 26, provide access to tank 10.

As is conventional with grease traps and other holding tanks holding a mixture of immiscible liquids, the lighter liquid "floats" on top of the heavier, or denser, liquid. Thus grease in a grease trap forms a grease mat layer (G) floating on grey water (W). As used herein "grease" may include oils and other lighter than water liquids commonly found in grease traps.

The apparatus of the present invention is comprised of a grease skimmer 28 to remove grease from grease mat (G), a sensor 30 having a detector end 32 to detect the presence of grease mat (G), a grease storage container 34 for receiving grease from collection tank 10, a conduit 36 connecting skimmer 28 to container 34, and a pump to propel grease collected by skimmer 28 into container 34.

The pump described herein is located in the first access port and is comprised of a compressed air cylinder 38, an air line 40 connecting cylinder 38 to skimmer 28, a pressure regulator 42 positioned in air line 40 to control the level of pressure, and an electronically controlled solenoid valve 44 positioned in air line 40 to control air flow to skimmer 28. The solenoid valve 44 includes control electronics which periodically open the valve 44 as long as an input signal from sensor 30 indicates the presence of grease in the grease mat.

Skimmer 28 is preferably of a type described in detail in co-pending application Ser. No. 08/149,182, filed Nov. 8, 1993, the entire disclosure of which is hereby incorporated by reference. Skimmer 28 has a grease inlet end 46, and valves 48 and 50. Grease rising above inlet end 46 will flow into the skimmer. When the presence of grease is detected by sensor 30, air injected into skimmer 28 closes valve 48 and propels the grease from skimmer 28 to storage container 34. The electronics portion of valve 44 then closes the valve 44 so that valve 48 opens to permit additional grease from the grease mat (G) to enter the skimmer. The valve 44 again closes so that the injected air from air line 40 enters the skimmer 32 to propel the next charge of grease in the toward the container 34. This process repeats until the sensor 30 no longer senses grease at its sensor level. The skimmer may be replaced by other grease/oil removers such as those shown in U.S. Pat. Nos. 5,133,881 to Miller, 4,983,284 to Batten, 4,268,396 to Lowe, 3,769,207 to Baer, 3,693,805 to Tillett et al., 4,264,450 to Ayers et al or 4,235,726 to Shimko, but the skimmer/pump described in the above mentioned co-pending application is preferred.

The components of the grease pump are suspended within access port 20 from a frame 52 mounted within access port 20. Sensor 30 is also suspended from frame 52 and extends into tank 10, with detector end 50 being positioned at a level in tank 10 with inlet end 46 of skimmer 28 to detect the presence of grease at a pumpable level in tank 10 and activate the air flow. Skimmer 28 is positioned below access port 20.

Skimmer 28 is connected by conduit 36 to collapsible grease storage container 34, located in access port 24, where it is suspended from a support frame 54. A relief valve 56 in communication with the interior of storage container 34 and the atmosphere permits the release of trapped air.

A heat sink 58 encloses a portion of container 34 and extends downwardly into contact with the grey water (W) and/or grease mat layer (G) to transfer heat to container 34, and thus prevent solidification of the grease therein. This maintains the grease in a flowable state so that grease removal personnel may remove the grease from the container 34.

Figure 2:
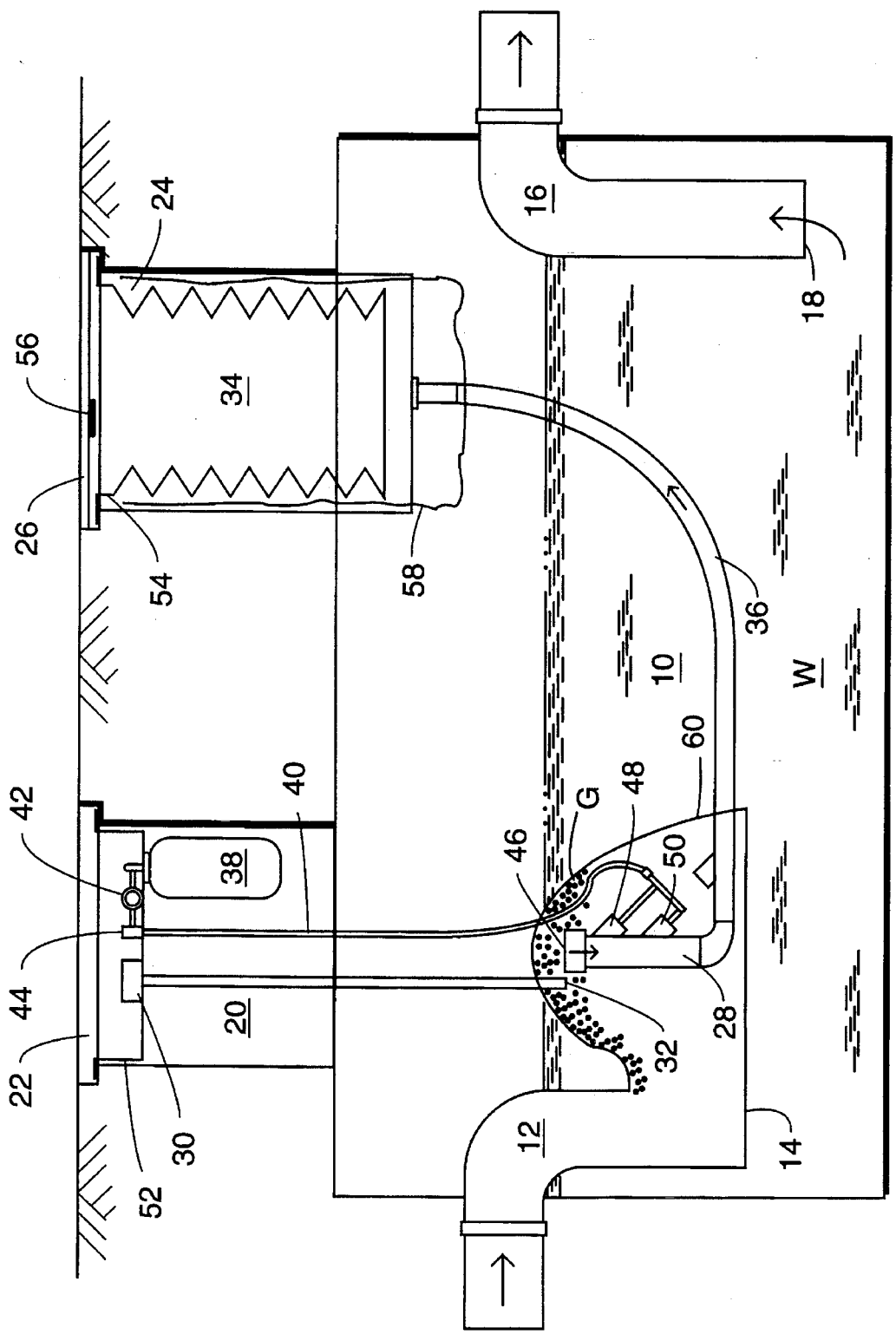
FIG. 2 is a similar view of an alternate embodiment equipped with a grease concentrator.

FIG. 2 illustrates an alternate embodiment in which a concentrator 60 is used to direct the grease mat to sensor 30 and skimmer 28. The concentrator concentrates grease for removal by the skimmer. That is, the skimmer has an inlet and the concentrator is provided in the form of a slanted baffle plate shaped like a witch's hat above the inlet 12 to the collection tank 10, as well as over the inlet to the skimmer 28. The concentrator 60 guides grease toward the skimmer and concentrates the grease there, rather than letting the grease spread over all of the grey water.

In operation, a mixture of grease and grey water enters tank 10 from a discharge source, for example a restaurant, through inlet pipe 12. In tank 10, the grease, being lighter than the water, forms a grease mat layer (G) on the surface of the grey water (W).

As more grease and water enters tank 10, the level of the grease mat layer (G) rises until it reaches inlet end 46 of skimmer 28. At this level, grease begins to flow into skimmer 28. Also, the presence of grease is detected by sensor 30, which opens solenoid control valve 44. Air, regulated by pressure regulator 42 to a pressure in the range of about 15–40 psi, then flows through air line 40 to grease skimmer 28, to close valve 48 and propel the grease through conduit 36 into storage container 34, which expands as the quantity of contained grease increases. The valve 44 continues to cycle through opening and closing phases until the sensor 30 no longer senses grease.

When the level of grease in grease mat (G) has been lowered so that it is no longer detectable by sensor 30, valve 44 closes and stays closed, stopping the flow of air to skimmer 28, and thus the flow of grease to storage container 34. Periodically, grease is removed from storage container 34, for removal to a remote destination. This removal can be by pumping or by lifting container 34 from the access port 24.

It is to be understood that the present apparatus may be used to modify grease traps used to separate two immiscible liquids other than grease and water, and that many modifications and variations of the described invention can be made without departing from the spirit and scope thereof.

What is claimed is:

1. An apparatus for separating grease from a mixture of grease and water in a grease collection tank having first and second access ports comprising:

(a) a skimmer adapted to be located in said collection tank beneath said first access port to collect grease from the tank;

(b) a pump supported by a first frame adapted to be positioned in the first access port;

(c) a grease storage container supported by a second frame adapted to be positioned in the second access port;

(d) a detector for detecting the presence of grease in the tank;

(e) a liquid flow path from said skimmer to said storage container; and (f) a slanted baffle plate over said skimmer to concentrate grease for removal by said skimmer;

whereby grease entering said skimmer is transmitted through said path and into said storage container, thereby separating the removed grease from water left in the tank.

2. An apparatus for separating grease from a mixture of grease and water comprising:

(a) a collection tank located below ground level and having first and second access ports extending upwardly to ground level;

(b) an inlet pipe for filling said tank with a mixture of grease and water, said inlet pipe having a discharge end in the upper part of said tank;

(c) an outlet pipe for removal of water from said tank, said pipe having an inlet end within said tank at a level below the discharge end of said inlet pipe;

(d) a grease skimmer having a inlet end positioned in said tank at a level above the discharge end of said inlet pipe;

(e) a grease sensor having a detector end located in said tank at a level with said skimmer inlet;

(f) a pump associated with said skimmer;

(g) an expandable storage container located below ground level in said second access port; and (h) a conduit connecting said skimmer and said storage container;

whereby said pump is activated by said sensor when said sensor detects the presence of grease to propel grease from said skimmer into said storage container.

3. The apparatus of claim 2, wherein said pump comprises a compressed air tank, an air line connecting said air tank to said skimmer, and a control valve positioned in said air line, said valve being periodically opened when grease is detected by said sensor to permit the flow of air from said air tank to said skimmer.

4. The apparatus of claim 2, wherein said skimmer is positioned in said collection tank beneath said first access port.

5. The apparatus of claim 2, further including a heat sink enclosing a portion of said container and extending into said tank to contact with grease therein.

6. An apparatus for separating grease from a mixture of grease and water in a grease collection tank having first and second access ports comprising:

a first frame adapted to be mounted in the first access port;

a second frame adapted to be mounted in the second access port;

a skimmer for collecting grease from the tank;

a detector for detecting the presence of grease in said tank;

a pump affixed to said first frame and operably arranged to pump collected grease from said skimmer when said detector detects grease;

an expandable grease storage container affixed to said second frame; and a conduit connecting said skinmaer and said storage container;

whereby grease entering said skimmer is transmitted through said conduit and into said storage container, thereby separating the removed grease from water left in the tank.

7. The apparatus of claim 6, wherein said pump comprises a compressed air tank, an air line connecting said air tank to said skimmer, and a control valve positioned in said air line, said valve being periodically opened when grease is detected by said sensor to permit the flow of air from said air tank to said skimmer.

8. An apparatus for separating grease from a mixture of grease and water in a grease collection tank located below ground level and having first and second access ports comprising:

(a) a skimmer adapted to be located within the tank to collect grease from the tank;

(b) a pump adapted to be positioned below ground level in the first access port;

(c) an expandable grease storage container adapted to be located below ground level in the second access port;

(d) a detector for detecting the presence of grease in the tank; and (e) a conduit from said skimmer to said storage container;

whereby grease entering said skimmer is transmitted through said conduit and into said storage container, thereby separating the grease from water left in the tank.

9. An apparatus for installation into a pre-existing grease trap that has first and second access ports above the grease trap to permit separation of grease from a mixture of grease and water held in the grease trap comprising:

a first frame adapted to be mounted in the first access port;

a second frame adapted to be mounted in the second access port;

a skimmer for location in the grease trap to collect grease from the trap;

a detector for detecting the presence of grease proximate the skimmer in the trap;

a pump supported by said first frame and operably arranged to pump collected grease from said skimmer when said detector detects grease proximate said skimmer;

a grease storage container supported by said second frame in the second access port above the grease trap; and a conduit connecting said skimmer and said storage container;

whereby grease entering said skimmer is transmitted through said conduit and into said storage container, thereby separating the removed grease from water left in the grease trap.

* * * * *